Patented June 6, 1939

2,161,078

UNITED STATES PATENT OFFICE 2,161,078

PROCESS FOR THE POLYMERIZATION OF TRICHLORETHYLENE

Martin Mugdan and Josef Wimmer, Munich, Germany, assignors to Consortium für Elektrochemische Industrie, G. m. b. H., Munich, Bavaria, Germany, a corporation No Drawing. Application December 28, 1936, Serial No. 117,903. In Germany January 6, 1936

3 Claims. (Cl. 260—654)

This invention relates to the production of polymerization products of trichlorethylene and has for its object to provide a simple and efficient process for this purpose.

We have found that trichlorethylene is converted into polymerized hydrocarbons of the formula of $C_{2n}H_nCl_{3n}$ by heating under pressure to temperatures above 150° C. Above 200° C. the polymerization is accompanied by a secondary reaction which takes place with the splitting off of HCl, which increases as the temperature rises. Temperatures at which substantial dissociation takes place are therefore to be avoided. Highly satisfactory results are obtained at temperatures of 180° to 210° C. Some metals, particularly iron, interfere with the polymerization or promote dissociation of the polymers. Containers with non-metal surfaces, such as glass, china, enamel, may be used to advantage.

Example 1

1 kilo of trichlorethylene was heated up to 185° C. in an iron autoclave with a glass lining under a pressure of about 25 atmospheres for 4½ hours. The dissociation of hydrogen chloride was very slight. 410 grams of unchanged trichlorethylene were distilled from the product. The distillation was continued under a vacuum of about 12 mm. mercury, and 500 grams of trichlorethylene polymer were passed over at about 107° C. Such polymer has the formula $C_4H_2Cl_6$ and boils at about 230° C. at a pressure of 710 mm. mercury.

Example 2

1 kilo of trichlorethylene was heated to 200° C. for three hours in a lead coated autoclave, during which 16 grams of HCl gas were split off. 600 grams of unchanged trichlorethylene were distilled off from the product. The rest was fractionated under reduced pressure of about 12 mm. mercury. From 85° C. and upwards, 300 grams of a product was passed over consisting for the greater part of the trichlorethylene polymer. The residue consisted partly of hexachlorobenzene and trichlorethylene polymers of higher boiling point.

Example 3

1 kilo of trichlorethylene was heated to 227° C. in a lead-coated autoclave for 3 hours during which 112 grams of HCl gas were split off. 100 grams of unchanged trichlorethylene were distilled off from the reaction product and the rest was fractionated under reduced pressure of about 12 mm. mercury. At 80° to 110° C. 400 grams of a mixture of polymerized trichlorethylene and its dissociation products passed over.

The polymers may be used as solvents and as starting materials for the production of other carbon compounds.

The invention claimed is:

1. Process for polymerizing trichlorethylene, principally to its dimerous polymer, which comprises heating trichlorethylene in the absence of a catalyst under a pressure above atmospheric to a temperature above 150° C. and below a temperature at which substantial decomposition occurs.

2. Process for polymerizing trichlorethylene, principally to its dimerous polymer, which comprises heating trichlorethylene in the absence of a catalyst under a pressure above atmospheric to a temperature of 150° to 227° C.

3. Process for polymerizing trichlorethylene, principally to its dimerous polymer, which comprises heating trichlorethylene in the absence of a catalyst under a pressure above atmospheric to a temperature of 180° to 210° C.

MARTIN MUGDAN.
JOSEF WIMMER.